United States Patent [19]

Mussi et al.

[11] Patent Number: 4,650,534
[45] Date of Patent: Mar. 17, 1987

[54] HELICOPTER BLADE LONGITUDINAL MEMBER AND RELATIVE MANUFACTURING METHOD

[75] Inventors: Fiorenzo Mussi, Milan; Emilio Pariani, Cardano al Campo, both of Italy

[73] Assignee: Costruzioni Aeronautiche Giovanni Agusta, S.p.A., Varese, Italy

[21] Appl. No.: 661,303

[22] Filed: Oct. 16, 1984

[30] Foreign Application Priority Data

Oct. 26, 1983 [IT] Italy ................... 68112 A/83

[51] Int. Cl.$^4$ .................. B21K 3/04; B23P 15/02; B23P 15/04
[52] U.S. Cl. .................. 156/245; 416/226; 416/230; 264/258
[58] Field of Search .............. 416/226, 230 A, 230, 416/229 R; 156/245; 264/257, 258; 29/156.8 B, 156.8 P

[56] References Cited

U.S. PATENT DOCUMENTS

| | | | |
|---|---|---|---|
| 3,754,840 | 8/1973 | Zincone | 416/230 A |
| 3,873,654 | 3/1975 | Smith | 156/245 |
| 3,967,996 | 7/1976 | Kamov et al. | 416/226 |
| 4,188,171 | 2/1980 | Baskin | 416/229 R |
| 4,247,348 | 1/1981 | Lischer | 156/245 |
| 4,298,417 | 11/1981 | Euler et al. | 156/245 |
| 4,299,540 | 11/1981 | Covington et al. | 416/226 |
| 4,379,013 | 4/1983 | Tambussi | 156/245 |
| 4,470,862 | 9/1984 | More et al. | 156/245 |

Primary Examiner—Carlton R. Croyle
Assistant Examiner—Donald E. Stout
Attorney, Agent, or Firm—Morgan & Finnegan

[57] ABSTRACT

There is disclosed a longitudinal member for a helicopter blade made by placing inside an open mold an open outer covering on which covering and in contact with are arranged a number of uncured axial straps which define top and bottom backs of the longitudinal member itself; the straps being compacted, prior to closure of the mold, against a center core and a front nose by inserting a rear element made of prehardened synthetic composite material, the rear element having an essentially C-shaped section and the opposite side edges of the outer covering being folded thereover prior to closure of the mold.

6 Claims, 2 Drawing Figures

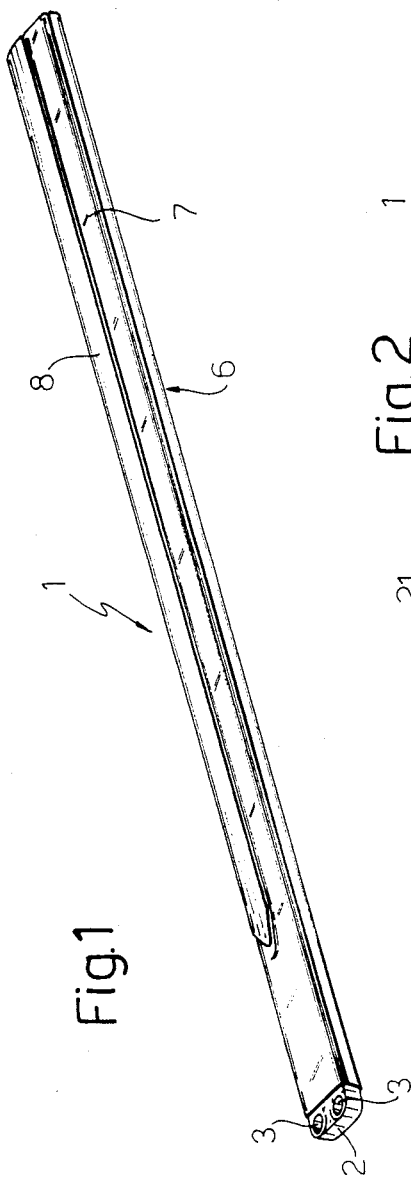
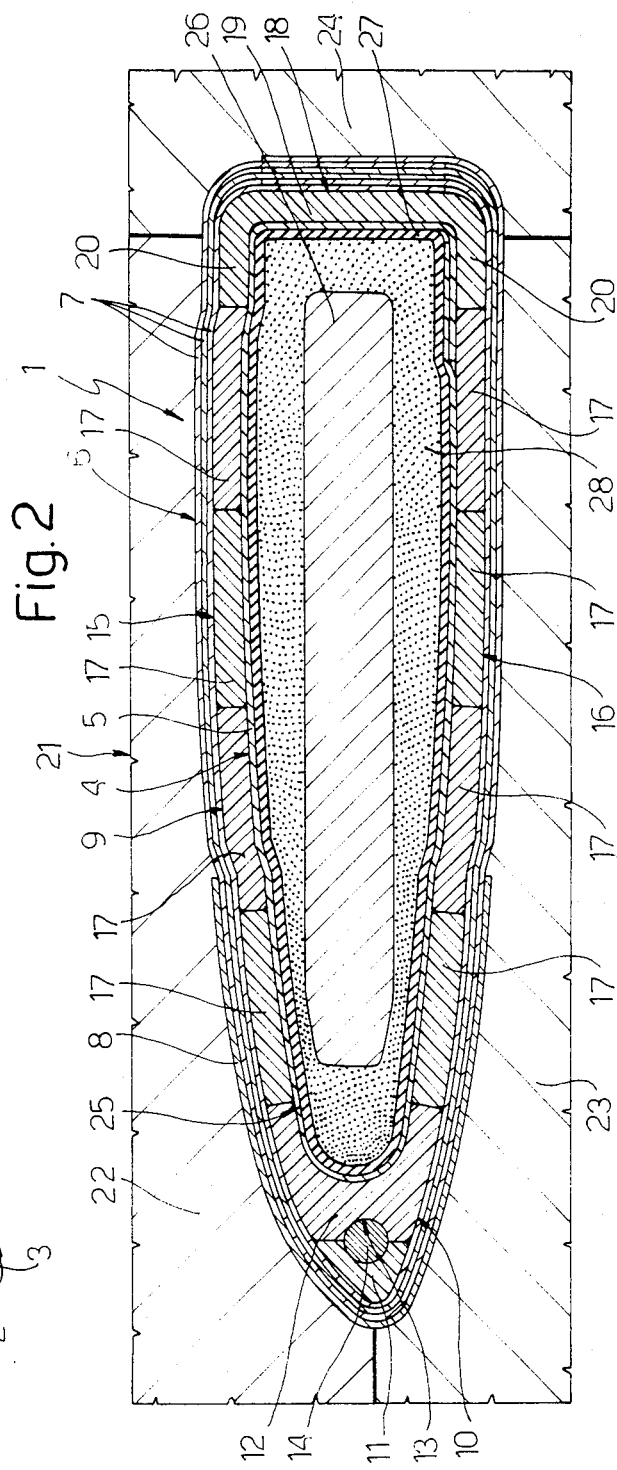

HELICOPTER BLADE LONGITUDINAL MEMBER AND RELATIVE MANUFACTURING METHOD

BACKGROUND OF THE INVENTION

The present invention relates to a helicopter blade longitudinal member.

Generally speaking, all known helicopter blades comprise an axial load-bearing element, consisting of a longitudinal member forming the front part of the blade, i.e. the part next to the leading edge, and a rear fairing made integral with the rear edge of the longitudinal member.

Known longitudinal members are made using a wide variety of materials, though the recent tendency has been increasingly towards the use of synthetic composite materials.

Known composite longitudinal members are usually tubular in shape and made by curing in a mold, usually starting from a number of axial straps made of uncured synthetic composite material. The straps are arranged over a removable inner core on mold and then covered with an outer covering of synthetic material which, when cured, becomes one with the straps and with any inner covering contacting the core.

Forming a composite longitudinal member of the aforementioned type is not always an easy job in that, on the one hand, the shape stability of the uncured straps is practically nil and, on the other hand, any gaps left in the uncured material inside the mold result either in surface defects or internal air pockets, which usually result in the longitudinal member being rejected.

The standard procedure for overcoming this drawback has been the definition of complicated forming procedures, usually involving manual compacting of the uncured elements placed one after another inside the mold. Though providing for fairly good results, such procedures not only involve considerable cost, but depend too highly on the skill and experience of the maker.

SUMMARY OF THE INVENTION

The aim of the present invention is to provide a longitudinal member having a structure which does not exhibit the aforementioned drawbacks.

With this aim in view, the present invention relates to a longitudinal member helicopter blade comprising an outer covering, an inner covering and an intermediate body, all consisting of synthetic composite material, the longitudinal member being characterized by the fact that the intermediate body comprises a front nose, top and bottom backs, each of the top and bottom backs comprising a number of adjacent axial straps, and a rear axial cover element; the cover element being made of prehardened material and having an essentially C-shaped section with its concave side facing the nose and extending part-way along the top and bottom backs and contacting the relative straps.

The present invention also relates to a method of manufacturing the aforementioned longitudinal member.

With this aim in view, the present invention relates to a method of manufacturing a longitudinal member for a helicopter blade, the method being characterised by the fact that it comprises the steps of:

opening a curing mold having an inner shape which matches the outer shape of the longitudinal member being formed;

lining a portion of the mold with a number of cloth strips made of uncured synthetic composite material and designed to form an outer covering on the longitudinal member;

placing on the strips a nose, made of uncured synthetic composite material, of the intermediate body of the longitudinal member;

forming the bottom and top backs of the body by laying a number of axial straps, made of uncured synthetic composite material, onto the outer covering and on opposite sides of a removable core in the mold, the core being covered with a strip providing an inner cover for the longitudinal member;

completing the body by inserting a rear element having an essentially C-shaped section and made of prehardened synthetic composite material into the mold in contact with the covered core and in lateral contact with the straps;

applying pressure on the rear element and compacting the straps against the nose and the outer and inner coverings;

folding the side edges of the outer covering strips and overlapping the same and covering the near element; and closing the mold.

BRIEF DESCRIPTION OF THE DRAWINGS

A non-limiting arrangement of the present invention will now be described with reference to the attached drawings in which:

FIG. 1 shows a view in perspective of a longitudinal member according to the present invention and;

FIG. 2 shows a larger-scale axial section of the longitudinal member shown in FIG. 1 inside the mold.

DETAILED DESCRIPTION OF THE INVENTION

Number 1 in FIG. 1 indicates a longitudinal member for a helicopter blade (not shown), the member comprising, at one end, a root portion 2 with holes 3 for connecting the blade to a hub (not shown).

As shown in FIG. 2, longitudinal member 1 presents a tubular structure and comprises an inner tubular counter-twist body 4, consisting of a strip of cross-woven-fibre cloth 5 of synthetic composite material wound into a tube, and a tubular outer covering 6 consisting of a number of cross-woven-fibre cloth strips 7 (three in number in the example shown) made of synthetic composite material and also wound into respective tubes by overlapping the side edges of the respective strips 7 along the rear edge of longitudinal member 1.

The front portion of outer covering 6 is covered with an iceproof covering 8 usually made of glass fibre and having built-in electric resisters (not shown).

Inner body 5 and outer covering 6 combine to enclose a middle tubular body 9 made of synthetic composite material and comprising a front nose 10 extending axially along the front edge of body 9 and an essentially triangular front portion 11 and an essentially C-shaped rear portion 12 with its concave side facing rearwards. Portions 11 and 12 combine to define a cylindrical recess 13 extending at least part-way along the length of body 9 and engaged by a cylindrical balancing insert 14 usually made of lead.

Body 9 also comprises top and bottom backs, 15 and 16, each of the backs consisting of a number of adjacent axial straps 17 (four in number in the example shown) consisting of synthetic composite material.

Finally, body 9 also comprises a rear axial cover element 18 having an essentially C-shaped section with its concave side facing front nose 10 and which consists of synthetic composite material prehardened by means of a precompacting or precuring process. Rear element 18 comprises a core 19, constituting an essentially flat rear wall on body 9, and two wings 20 defining part of top and bottom backs 15 and 16, respectively, and arranged lateral contact with respective straps 17.

As shown in FIG. 2, longitudinal member 1 is formed using a mold 21 comprising two front half-molds, 22 and 23, facing each other, and a rear cover 24. Mold 21 also comprises a core 25 consisting of an inner metal insert 26 located inside a bag 27 usually made of rubber and separated from the latter by a layer of uneven foam material 28 usually consisting of polystyrene foam balls (not shown).

Longitudinal member 1 is formed as follows: Initially, mold 21 is opened and the working surface of half-mold 23 lined, in overlapping and open manner, with strips 7, only a portion of which are laid in contact with half-mold 23. On top of the portion of strips 7 resting on half-mold 23, nose 10 and straps 17 of bottom back 16 are placed in succession and on top of which is then laid openly a portion of strip 5. Core 25 is placed top of the latter and strip 5 is folded over the core so as to form inner covering body 4.

Alternatively, core 25 may be covered with strip 5 before being placed on half-mold 23.

Subsequently, straps 17 of top back 15 are laid on top of strip 5 and strips 7 are then folded over straps 17. At this point, half-mold 22 can be fitted on to half-mold 23 so as to define a recess, open at the rear, for longitudinal member 1 being formed. Rear element 18, which is stiff enough to be applied with pressure in order to compact the uncured material previously arranged in the mold, and particularly straps 17, is then inserted through the rear open end of mold 21 in close contact with strips 5 and 7.

The opposite side edges of strips 7 are then overlapped contacting the outer surface of element 18 and mold 21 is closed by fitting cover 24 thereon.

The synthetic material is cured inside mold 21 by applying heat which melts polystyrene layer 28 down to practically nil, thus enabling support 26 and bag 27 to be taken off the formed longitudinal member 1 when mold 21 is opened.

An alternative to the above procedure is to assemble half-molds 22 and 23 together from the onset. In this case, U-bent strips 7, nose 10, straps 17 of both bottom and top backs 16 and 15 and core 25, covered with strip 5, are inserted one after the other through the open, upward rear end of mold 21. Element 18 is then inserted and strips 7 folded over it in the same way as previously described.

In carrying out this invention nose 10 is preferably prehardened by means of precompacting in order to assist the compacting action of element 18.

We claim:

1. Method for manufacturing a longitudinal member (1) for a helicopter blade, the method being characterized by the fact that it comprises the steps of opening a curing mold (21) having an inner shape which matches the outer shape of the longitudinal member being formed; lining a portion of said mold with a portion of a number of cloth strips (7) made of uncured synthetic composite material to form an outer covering (6) for said longitudinal member; placing a nose (10), made of uncured synthetic composite material, on said cloth strips; laying a number of axial straps (17), made of uncured synthetic composite material, on said outer covering (6) and on opposite sides of a removal core (25) disposed in said mold and covered with a strip (5) to provide an inner core (4) for said longitudinal member and form top (15) and bottom (16) backs for said intermediate body (9); inserting into said mold a rear element (18), made of prehardened synthetic composite material and having a C-shaped section, and contacting the covered core (25) and laterally contacting said straps (17) therewith; applying pressure on said straps (17) against said nose (10) and said outer covering (6) and inner cover (4); folding the side edges of said outer strips (7) and overlapping the same with each other and with said rear element (18); and closing said mold.

2. Method according to claim 1, characterized by the fact that said rear element (18) is prehardened by compacting.

3. Method according to claim 1, characterized by the fact that said rear element (18) is prehardened by curing.

4. Method according to claim 1, characterized by the fact that it includes a hot-curing stage for curing the uncured synthetic composite materials inside the mold.

5. Method according to claim 4, characterized by the fact that the core (25) comprises an elastomer bag (27) at least partly filled with material (28) which shrinks when heated.

6. Method according to claim 1, characterized by the fact that the nose (10) is prehardned.

* * * * *